US 6,644,113 B2

(12) United States Patent
Kawai et al.

(10) Patent No.: US 6,644,113 B2
(45) Date of Patent: Nov. 11, 2003

(54) FLOW-RATE DETECTING DEVICE FOR HEAT-SENSITIVE TYPE FLOW SENSOR

(75) Inventors: Masahiro Kawai, Tokyo (JP); Motohisa Taguchi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/983,081

(22) Filed: Oct. 23, 2001

(65) Prior Publication Data

US 2002/0157463 A1 Oct. 31, 2002

(30) Foreign Application Priority Data

Apr. 27, 2001 (JP) ........................................ 2001-132353

(51) Int. Cl.[7] ................................................. G01F 1/68
(52) U.S. Cl. ................................................... 73/204.26
(58) Field of Search ........................ 73/204.23, 204.25, 73/204.26, 204.15, 204.16, 204.11

(56) References Cited

U.S. PATENT DOCUMENTS

| 4,934,190 A | * | 6/1990 | Lee ........................ 338/22 SD |
| 5,237,867 A | * | 8/1993 | Cook, Jr. .................. 73/204.15 |
| 5,452,610 A | * | 9/1995 | Kleinhans et al. ........ 73/204.25 |
| 5,936,157 A | * | 8/1999 | Yamashita et al. ....... 73/204.26 |
| 5,965,811 A | * | 10/1999 | Kawai et al. .............. 73/118.2 |

FOREIGN PATENT DOCUMENTS

| JP | 6-249693 | 9/1994 |
| JP | 5-164575 | 12/1995 |
| JP | 2001-050787 | 2/2001 |

* cited by examiner

Primary Examiner—Harshad Patel
(74) Attorney, Agent, or Firm—Sughrue Mion, PLLC

(57) ABSTRACT

A flow-rate detecting device for a heat-sensitive type flow sensor having high reliability. The device includes a planar substrate having first and second through-holes formed therein in juxtaposition with each other, an insulative supporting film formed over one major surface of the substrate so as to cover the through-holes, a fluid temperature measuring resistor formed by a heat-sensitive resistor film deposited at a location of the first through-hole on the supporting film oppositely to the substrate, a heat generating resistor formed of a heat-sensitive resistance film deposited at a location of the second through-hole on the supporting film oppositely to the substrate, an insulative protection film deposited so as to cover the fluid temperature measuring resistor and the heat generating resistor, and a reinforcing film provided for the fluid temperature measuring resistor. The reinforcing film is not provided for the heat generating resistor. Flow rate or alternatively flow speed of a fluid is measured by taking advantage of phenomenon of heat transfer to the fluid from the heat generating resistor.

6 Claims, 14 Drawing Sheets

FLOW-RATE DETECTING DEVICE FOR HEAT-SENSITIVE TYPE FLOW SENSOR

BACKGROUND OF THE INVENTION

1. Field of the Invention

The present invention generally relates to a flow sensor for measuring a flow speed or flow rate of a fluid such as, for example, flow rate of an intake air in an internal combustion engine system or the like. More particularly, the present invention is concerned with an improved structure of a flow-rate detecting device for the flow sensor which device includes a heating element for measuring the flow speed or flow rate of a flowing fluid on the basis of phenomenon of heat transmission or heat transfer from the heating element to the flowing fluid.

2. Description of Related Art

For better understanding of the concept underlying the present invention, description will first be made of the hitherto known or conventional flow-rate detecting device for the flow sensor by reference to FIGS. 14 and 15 of the accompanying drawings, in which FIG. 14 is a top plan view showing a conventional flow-rate detecting device of diaphragm type which is disclosed, for example, in Japanese Unexamined Patent Application Publication No. 249693/1994 (JP-A-6-249693), and FIG. 15 is a sectional view of the same taken along a line G—G and viewed in the direction indicated by arrows in FIG. 14.

Referring to FIGS. 14 and 15, the flow-rate detecting device generally denoted by 12 includes a heating element 51 formed on a membrane or film 53 and a fluid temperature measuring element 52 formed on a membrane or film 54. Both the films 53 and 54 are supported under tension on a frame 56 which is made of single crystal silicon. Disposed between the films 53 and 54 is a supporting member 58 formed of silicon which serves as an isothermal element (see FIG. 15). To this end, the frame 56 is made of a silicon plate 57 which is formed or pierced with a pair of through-holes 60 each of trapezoidal form in vertical section as viewed in FIG. 15. These through-holes 60 of trapeziform in section extend to a film layer 59 which is formed on a top surface (as viewed in FIG. 15) of the silicon plate 57, whereby a pair of diaphragm structures are implemented. Further, terminals 55 are provided on the frame 56 for electrical connection to an external circuit of the fluid sensor.

The conventional flow-rate detecting device 12 implemented in the diaphragm structure as described above suffers a problem that solid particulates or particles such as sands, dusts, etc. carried by the measurement-destined fluid (i.e., fluid whose flow rate or speed is to be measured) collide with the diaphragms which may thereby be physically broken or fractured. For coping with this problem, the mechanical strength of the diaphragms may be increased by increasing the thickness of those portions of the film layer 59 which correspond to the diaphragms, respectively. However, in that case, sensitivity of the flow sensor will become lowered due to the increased thickness of the film layer 59, which results in degradation of the response performance or characteristic of the flow sensor, giving rise to another problem.

In general, a supporting film and a protection film which constitute parts of the film layer 59 are formed by controlling the conditions for film formation such that a predetermined tensile stress is applied so that the diaphragm can be protected against deformation or distortion even when the heat generating resistance film which serves as the heating element undergoes thermal expansion. More specifically, when the diaphragm is deformed, large stress makes appearance between the diaphragm and the heat-sensitive resistance film which serves as the temperature detecting element, as a result of which delamination takes place between the heat-sensitive resistance film and the diaphragm, exerting adverse influence to the detection performance of the flow-rate detecting device and hence of the flow sensor. Furthermore, when remarkably large deformation has occurred, dispersion or variance will take place in the film deformation due to dispersion or variance of the thermal and/or mechanical properties (physical properties) of the film, which involves adverse influence to the detection output characteristic of the flow sensor, making thus it difficult or impossible to realize the flow-rate detection with acceptable accuracy and reliability.

Further, when the tensile stress mentioned above is set excessively high, the margin for the breaking stress under which the diaphragm is fractured becomes narrower, as a result of which the diaphragm becomes more likely to be fractured. For the reason mentioned above, it is desirable to set the internal stress of the diaphragm such that no deformation of the diaphragm can occur under the tensile stress set as low as possible even when the heating resistor undergoes thermal expansion.

In the environment in which the flow sensor is ordinarily employed, the internal stress of the diaphragm provided with the heating element (formed of a heat generating resistance film) is set lower than the diaphragm which is provided with the fluid temperature measuring element (also formed of a heat-sensitive resistance film) in view of the thermal expansion which the heat generating resistance film undergoes. Accordingly, the margin of the diaphragm provided with the fluid temperature measuring element to the fracture stress is narrower than the diaphragm provided with the heating resistance element and thus the former is more likely to be fractured when compared with the latter.

SUMMARY OF THE INVENTION

In the light of the state of the art described above, it is an object of the present invention to solve the problems of the conventional flow sensor and provide an improved structure of a flow-rate detecting device for a heat-sensitive type flow sensor which device can ensure an enhanced reliability for flow-rate detecting operation owing to the increased strength of a diaphragm structure as a whole by providing a reinforcing film for a diaphragm portion in which a fluid temperature measuring element is incorporated and which is thus more susceptible to fracture.

In view of the above and other objects which will become apparent as the description proceeds, there is provided according to a general aspect of the present invention a flow-rate detecting device for a heat-sensitive type flow sensor, which device includes a planar substrate having first and second through-holes formed therein in juxtaposition with each other, an insulative supporting film formed over one major surface of the substrate so as to cover the through-holes, a fluid temperature measuring resistor formed by a heat-sensitive resistor film deposited at a location of the first through-hole on the supporting film oppositely to the substrate, a heat generating resistor formed of a heat-sensitive resistance film deposited at a location of the second through-hole on the supporting film oppositely to the substrate, an insulative protection film deposited so as to cover the fluid temperature measuring resistor and the heat generating resistor, and a reinforcing film provided for the fluid temperature measuring resistor. The reinforcing film is not provided for the heat generating resistor. Flow rate or alternatively flow speed of a fluid is measured on the basis of phenomenon of heat transfer to the fluid from the heat generating resistor.

By virtue of the structure described above, there can be realized the flow-rate detecting device in which the strength of the diaphragm is increased without degrading the flow detection sensitivity and response performance and which ensures enhanced reliability for the flow-rate detecting operation.

In a preferred mode for carrying out the present invention, the reinforcing film may be deposited at a location of the first through-hole on a surface of the protection film oppositely to the fluid temperature measuring resistor.

Owing to the structure described above, there can be realized the flow-rate detecting device in which the strength of the diaphragm is increased without degrading the flow detection sensitivity and response performance while ensuring high reliability for the flow-rate detecting operation.

In another preferred mode for carrying out the present invention, the reinforcing film may be deposited at a location of the first through-hole on a back surface of the supporting film oppositely to the fluid temperature measuring resistor.

With the structure of the flow-rate detecting device described above, the flow characteristic of the fluid concerned can be stabilized with turbulence being suppressed because the exposed surface of the flow-rate detecting device is formed smoothly.

In yet another preferred mode for carrying out the present invention, the reinforcing film may be formed of a heat-sensitive resistance film deposited around the fluid temperature measuring resistor.

With the structure of the flow-rate detecting device described above, the reinforcing film can be formed simultaneously with the heating resistor and the fluid temperature measuring resistor, whereby the number of the manufacturing steps can be reduced and thus the flow-rate detecting device can be implemented easily and inexpensively.

In still another preferred mode for carrying out the present invention, the reinforcing film may be so formed as to be embedded in the supporting film at a location of the first through-hole.

With the structure of the flow-rate detecting device described above, the material for the reinforcing film can be selected with a high degree of freedom without need for taking into consideration the anti-corrosiveness of the material.

In a further preferred mode for carrying out the present invention, the reinforcing film may be so formed as to be embedded in the protection film at a location of the first through-hole.

With the structure of the flow-rate detecting device described above, the material for the reinforcing film can be selected with a high degree of freedom without considering the anti-corrosiveness.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which.

DESCRIPTION OF THE PREFERRED EMBODIMENTS

Figure 1:
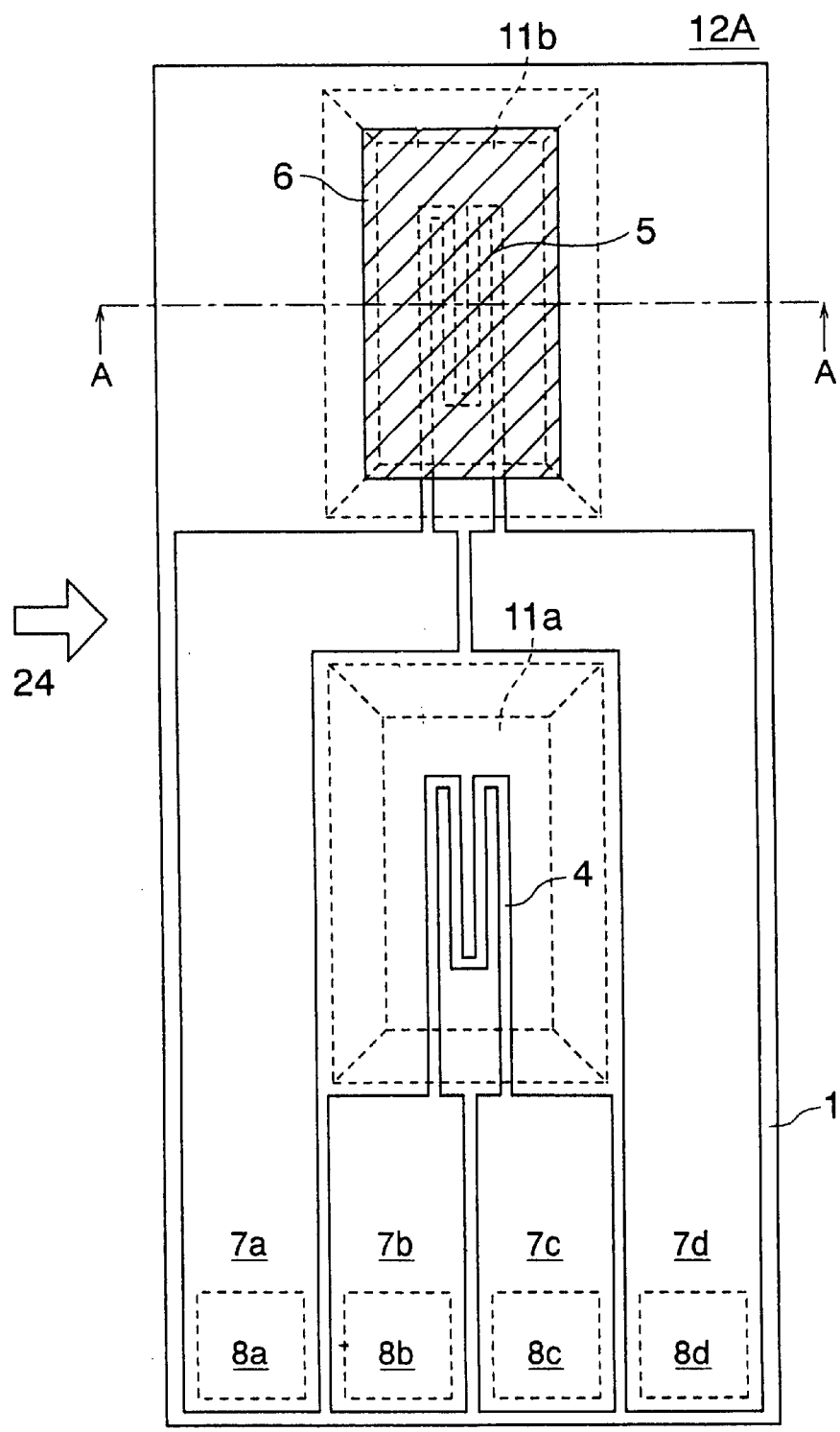
FIG. 1 is a top plan view showing a flow-rate detecting device for a heat-sensitive type flow sensor according to a first embodiment of the present invention.

The present invention will be described in detail in conjunction with what is presently considered as preferred or typical embodiments thereof by reference to the drawings. In the following description, like reference characters designate like or corresponding parts throughout the several views. Also in the following description, it is to be understood that such terms as "top", "back", "vertical" and the like are words of convenience and are not to be construed as limiting terms.

Embodiment 1

Figure 2:
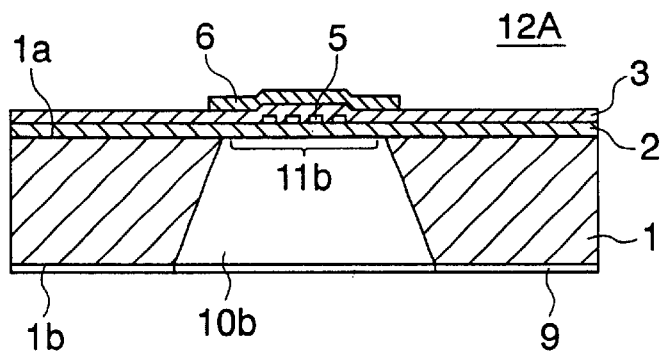
FIG. 2 is a sectional view of the same taken along a line A—A and viewed in the direction indicated by arrows in FIG. 1.

FIG. 1 is a top plan view showing a flow-rate detecting device 12A employed in a heat-sensitive type flow sensor according to a first embodiment of the present invention. In the figure, a protection film is omitted for the purpose of showing clearer the structure of the flow-rate detecting device. Further, FIG. 2 is a sectional view of the flow-rate detecting device 12A taken along a line A—A and viewed in the direction indicated by arrows in FIG. 1. Incidentally, it should be mentioned that in FIGS. 1 and 2, the flow-rate detecting device is not shown in the actual size or dimensions for facilitating understanding of the structure thereof. Same holds true in the other figures.

Referring to FIGS. 1 and 2, reference numeral 1 denotes a substrate which is made of silicon. An insulative supporting film 2 formed of silicon nitride is deposited allover on one major surface of the substrate 1. On the other hand, deposited on the supporting film 2 are a heat generating resistor 4, a fluid temperature measuring resistor 5 and lead patterns 7a to 7d, all of which are formed of heat-sensitive resistance films, respectively, Additionally, an insulative protection film 3 of silicon nitride is formed on the supporting film 2 so as to cover the heat generating resistor 4, the fluid temperature measuring resistor 5 and the lead patterns 7a to 7d. Further, a reinforcing film 6 formed of a polymer of silicon series is deposited only over the fluid temperature measuring resistor 5. At this juncture, it should be mentioned that the heat-sensitive resistance films which constitute the heat generating resistor 4, the fluid temperature measuring resistor 5 and the lead patterns 7a to 7d, respectively, are each made of an electrically conductive material whose resistance value exhibits temperature dependency. As a typical one of such material, platinum may be mentioned.

As can be seen in FIG. 1, those portions of the protection film 3 which cover end portions of the individual lead patterns 7a to 7d are removed, whereby these end portions of the lead patterns 7a to 7d are exposed to thereby form electrodes 8a to 8d, respectively. The electrodes 8a to 8d are adapted to be electrically connected to an external circuit such as, for example, a control circuit shown in FIG. 5, by resorting to a known method such as wire bonding or the like. In this manner, the heat generating resistor 4 and the fluid temperature measuring resistor 5 can electrically be coupled to the external circuit by way of the lead patterns 7a to 7d and the electrodes 8a to 8d.

Formed partially in the substrate 1 adjacent to the heat generating resistor 4 is a space or cavity 10a (a second through-hole) having a trapeziform in vertical section (as viewed in FIG. 2) and extending to the supporting film 2 from the other major surface (also referred to as the back surface) of the substrate 1. A similar space or cavity 10b (a first through-hole) is formed in the substrate 1 adjacent to the fluid temperature measuring resistor 5. In this manner, a thin diaphragm 11a which is constituted by a film lamination including the heat generating resistor 4 sandwiched between the supporting film 2 and the protection film 3 and having a peripheral portion held by the substrate 1 is integrally formed with the substrate. Similarly, a thin diaphragm 11b constituted by a film lamination including the fluid temperature measuring resistor 5 sandwiched between the supporting film 2 and the protection film 3 and having a peripheral portion secured fixedly to the substrate 1 is integrally formed with the substrate. Incidentally, an arrow 24 shown in FIG. 1 indicates a flow direction in which a measurement-destined fluid (i.e., fluid whose flow rate or speed is to be measured) flows relative to the flow-rate detecting device 12A.

Next, description will be made of a process of manufacturing the flow-rate detecting device 12A of the structure described above. At first, silicon nitride is deposited over the one major surface (top surface as viewed in FIG. 2) 1a of the substrate 1 having a thickness of 0.4 μm in the form of a film of 1 μm in thickness by resorting to a sputtering method, a CVD (Chemical Vapor Deposition) method or the like, to thereby form the supporting film 2 on the substrate 1.

Subsequently, platinum is deposited over the whole surface of the supporting film 2 in the form of a film of 0.2 μm in thickness through an evaporation, sputtering or the like method, which is then followed by patterning of the platinum film through photoengraving, wet-etching or dry-etching or the like process to thereby realize the heat generating resistor 4, the fluid temperature measuring resistor 5 and the lead patterns 7a to 7d, respectively.

Further, silicon nitride is deposited over the whole surface of the supporting film 2 in the form of a film having a thickness of 1 μm by resorting to a sputtering method, a CVD method or the like, to thereby form the protection film 3. Additionally, a polymer of silicon series is applied over the protection film 3 in a film thickness of e.g. 1 μm. Subsequently, a reinforcing film 6 is formed by patterning the film of polymer of silicon series through photoengraving, wet-etching or dry-etching or the like process only in the region extending over the fluid temperature measuring resistor 5. In succession, those portions of the protection film 3 which are deposited on the end portions of the lead patterns 7a to 7d, respectively, are removed through photoengraving, wet-etching or dry-etching or the like process to thereby form the electrodes 8a to 8d, respectively.

Thereafter, the whole back surface 1b of the substrate 1 is coated with a resist to form a back-surface protecting film 9, which is then followed by formation of the etching holes 13 in the protecting film 9 by resorting to a photoengraving process or the like. Subsequently, portions of the substrate 1 are removed throughout the regions extending from the back surface 1b to the supporting film 2 by resorting to e.g. an alkali etching process, to thereby form the diaphragm structures (hereinafter also referred to simply as the diaphragms) 11a and 11b. As the etchant to this end, there may be mentioned KOH, TMAH (Tetra Methyl Ammonium Hydroxide), NaOH or the like.

Parenthetically, each of the diaphragms 11a and 11b is implemented in a size of 1.5 mm×2 mm, while the heat generating resistor 4 and the fluid temperature measuring resistor 5 are formed at center portions of the diaphragms 11a and 11b, respectively, each in a size of 0.8 mm×1 mm. Further, the reinforcing film 6 formed only in the diaphragm 11b is implemented in a size of e.g. 2 mm×2.5 mm.

Next, referring to FIGS. 3 and 4, description will be made of a structure of a flow sensor 100 which incorporates the flow-rate detecting device 12A of the structure described above. In this conjunction, FIG. 3 is a front end view of the heat-sensitive type flow sensor according to a first embodiment of the present invention, and FIG. 4 is a sectional view of the same taken along a line B—B and viewed in the direction indicated by arrows in FIG. 3.

Figure 3:
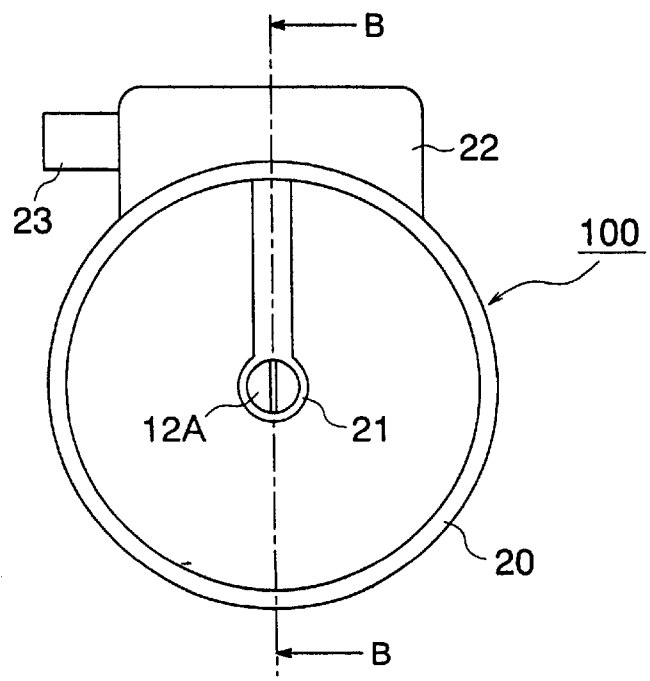
FIG. 3 is a front end view of the heat-sensitive type flow sensor according to the first embodiment of the present invention.
Figure 4:
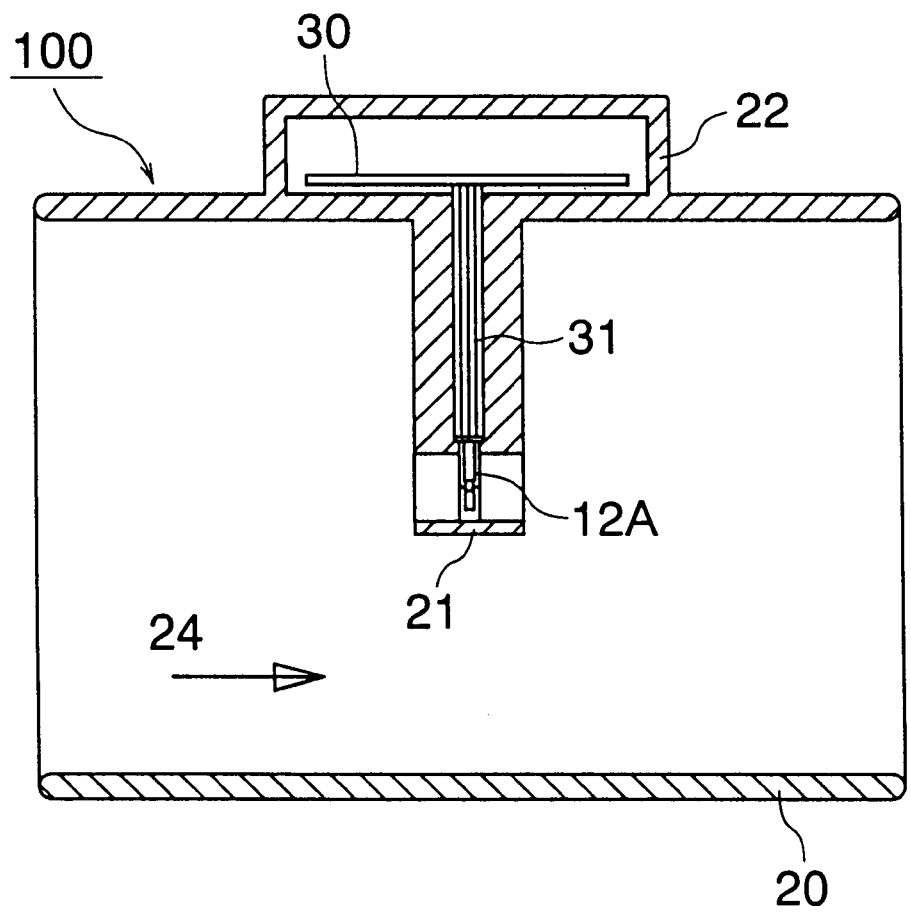
FIG. 4 is a sectional view of the same taken along a line B—B and viewed in the direction indicated by arrows in FIG. 3.

Referring to FIGS. 3 and 4, reference numeral 100 denotes a flow sensor comprised of a main passage 20 through which the measurement-destined fluid flows, a detection-destined passage 21 disposed coaxially within the main passage 20, a casing 22 accommodating therein a control circuit substrate 30, a connector 23 for supplying electric power to the flow sensor 100 and taking out the output of the flow sensor 100, and the flow-rate detecting device 12A disposed within the detection-destined passage 21. The electrodes 8a to 8d of the flow-rate detecting device 12A are electrically connected to the control circuit substrate 30 by lead wires denoted collectively by reference numeral 31 (FIG. 4).

The flow-rate detecting device 12A is disposed within the detection-destined passage 21 in such orientation that the major surfaces of the planar substrate 1 extend in parallel with the flowing direction 24 of the measurement-destined fluid and are exposed to the flow thereof.

Figure 5:
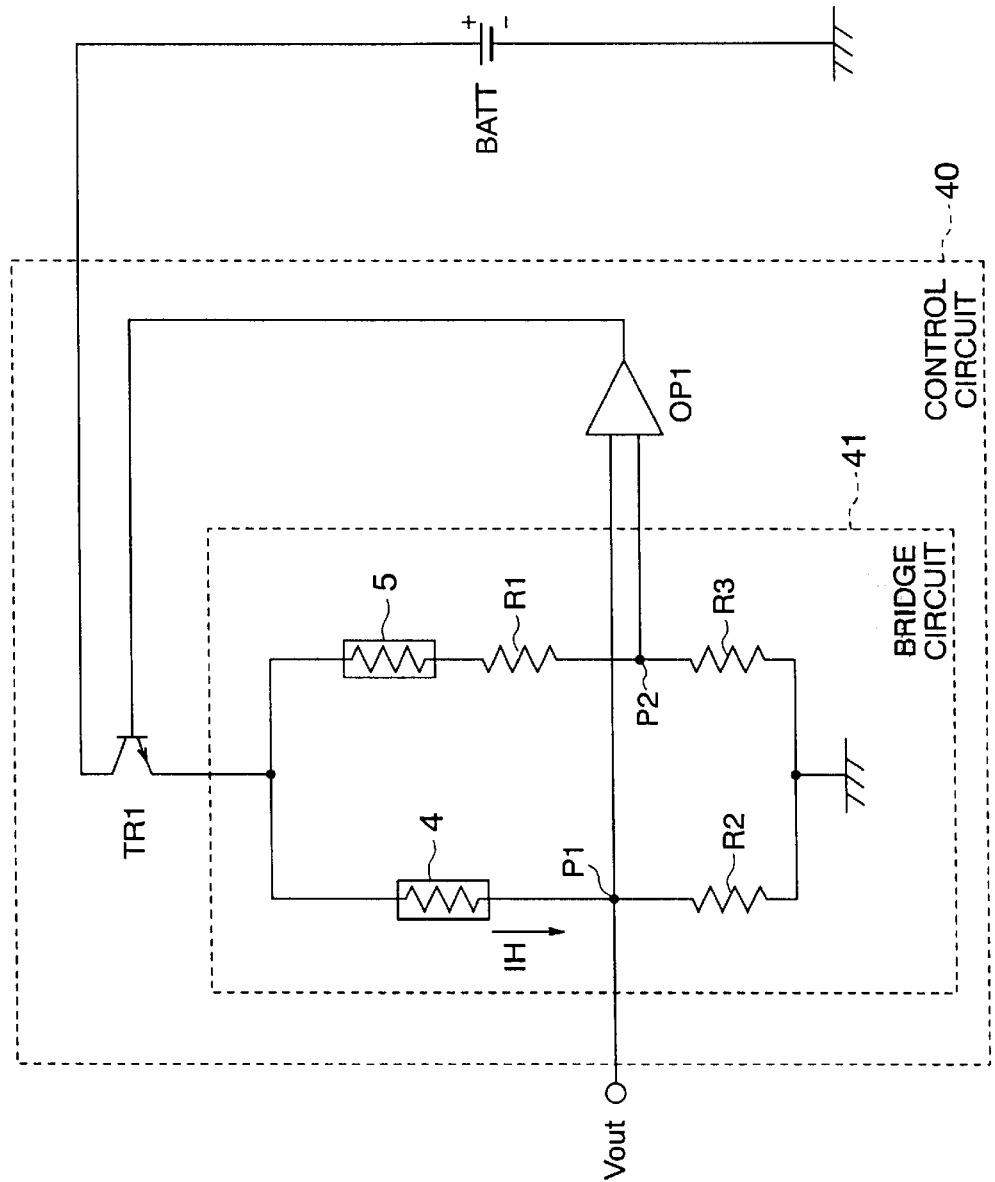
FIG. 5 is a circuit diagram showing a control circuit incorporated in the heat-sensitive type flow sensor according to the first embodiment of the present invention.

A control circuit 40 of the flow sensor 100 is realized in the form of a bridge circuit 41 comprised of the fluid temperature measuring resistor 5 and the heat generating resistor 4, as shown in FIG. 5. In this figure, reference characters R1, R2 and R3 denote fixed resistors, respectively. Further, OP1 denotes an operational amplifier, TR1 denotes a transistor, and BATT denotes a power source. Except for the fluid temperature measuring resistor 5 and the heat generating resistor 4, the components of the control circuit are packaged on the control circuit substrate 30.

The control circuit 40 operates such that the potential at a circuit point P1 is substantially equal to that of a circuit point P2 and is designed to control a heating current IH flowing through the heat generating resistor 4. More specifically, when the flow velocity or speed of the measurement-destined fluid increases, heat transfer to the fluid is promoted, as a result of which the heating current IH increases in order to maintain the mean temperature of the heat generating resistor 4 at a predetermined value. The heating current IH is detected as a voltage Vout making appearance across the resistor R2. In this manner, the flow speed or flow rate of the fluid flowing through the passage of a predetermined cross-sectional area can be measured in terms of the detected voltage Vout.

Now representing the resistance value of the heat generating resistor 4 by RH, the mean temperature of the heat generating resistor 4 by TH, the temperature of measurement-destined fluid by TA, and the flow rate of a fluid flowing through the passage of a predetermined cross-sectional area by Q, then the following expression (1) applies valid.

$$IH^2 \times RH = (a + b \times Q^n) \times (TH - Ta) \qquad (1)$$

where a, b and n represent constants or coefficients determined by structural factors of the flow-rate detecting device. More specifically, a is a coefficient representative of a heat quantity which is independent of the flow rate and a major proportion of which is ascribable to conduction loss of the heat transferred to the planar substrate 1 from the heat generating resistor 4. On the other hand, b is a coefficient indicative of a heat transfer brought about by the forced convection. Further, n represents a value which is determined in dependence on the behavior of the flow of the fluid in the vicinity of the heat generating resistor 4 and which is on the order of 0.5. As is obvious from the expression (1), the heat quantity represented by the coefficient a plays no role in the flow-rate detection.

Although the above description has been made on the presumption that a direct heating control scheme is adopted with the heat generating resistor 4 and the fluid temperature measuring resistor 5 being directly inserted in the bridge circuit 41, it goes without saying that an indirect heating control scheme can equally be adopted in which a temperature measuring resistor is disposed in the vicinity of the heat generating resistor 4 with the temperature measuring resistor mentioned above and the fluid temperature measuring resistor 5 being connected in the bridge circuit substantially to the same effect, although the indirect heating control scheme is omitted from illustration.

In the flow-rate detecting device 12A implemented as described above, the supporting film 2 and the protection film 3 are formed by controlling the conditions for formation of these films such that a tensile stress is generated so that the diaphragm 11a can be protected against deformation or distortion even when the heat generating resistor 4 serving as the heating element undergoes thermal expansion. This is for the reason that when a large stress makes appearance between the diaphragm 11a and the heat-sensitive resistance film due to deformation of the diaphragm, delamination takes place between the heat-sensitive resistance film and the diaphragm 11a, exerting adverse influence to the detection characteristic of the flow sensor. Furthermore, dispersion or variance will take place in the film deformation upon detection of the flow sensor due to dispersion or variance of the thermal and/or mechanical properties (i.e., physical properties) of the film, which incurs adverse influence to the flow detection performance or characteristic of the flow sensor, making thus it difficult or impossible to realize the flow-rate detection with acceptable accuracy and reliability.

Further, when the internal stress of the diaphragm 11a is set to be excessively high, the margin for the breaking stress under which the diaphragm 11a is fractured becomes narrower or decreases, as a result of which the diaphragm becomes more likely to be fractured. Thus, it is desirable to set the internal stress of the diaphragm 11a to a tensile level set as low as possible (e.g. 100 MPa in the state where no heat is generated) such that no deformation of the diaphragm 11a can nevertheless occur even under the heating of the heating resistor 4.

The internal stress of the diaphragm 11b which includes the fluid temperature measuring resistor 5 realized in the same geometrical form as the heat generating resistor 4 should be substantially same as the internal stress of the diaphragm 11a in the state where no heat is generated.

At this juncture, it should be mentioned that the diaphragm 11b is provided for the purpose of ensuring the improved detection performance of the flow-rate detecting device in response to the change of the fluid temperature. In this conjunction, it is further noted that the diaphragm 11a is subjected to thermal expansion due to heat generation of the heat generating resistor 4 and thus the internal stress of the diaphragm 11a is lower than that of the diaphragm 11b provided with the fluid temperature measuring resistor 5 which generates no heat in the ordinary operation. Consequently, the diaphragm 11b provided with the fluid temperature measuring resistor 5 exhibits lower strength for the solid particulates or particles such as sands, dusts or the like than the diaphragm 11a provided with the heat generating resistor 4. In other words, the diaphragm 11b including the fluid temperature measuring resistor 5 is more likely to be fractured when compared with the diaphragm 11a including the heat generating resistor 4. In that case, the strength of the diaphragm structure may be increased by increasing the thickness of the supporting film 2 and the protection film 3. However, the capacity of the diaphragm 11a provided with the heat generating resistor 4 will then increase, incurring degradation in the sensitivity and the response characteristic of the flow-rate detecting device.

The flow-rate detecting device for the heat-sensitive type flow sensor according to the first embodiment of the present invention includes the substrate 1 having first and second through-holes 10b and 10a formed therein in juxtaposition with each other, the insulative supporting film 2 formed over the one major surface of the substrate 1 so as to cover the through-holes 10b and 10a, the fluid temperature measuring resistor 5 formed by the heat-sensitive resistor film deposited at the location of the first through-hole 10b on the supporting film 2 oppositely to the substrate 1, the heat generating resistor 4 formed of the heat-sensitive resistance film and deposited at the location of the second through-hole 10a on the supporting film 2 oppositely to the substrate 1, the insulative protection film 3 deposited so as to cover the fluid temperature measuring resistor 5 and the heat generating resistor 4, and the reinforcing film 6 provided only for the fluid temperature measuring resistor 5, wherein the flow rate or flow speed is measured on the basis of the phenomenon of heat transfer to the fluid from the heat generating resistor 4 as heated. In this conjunction, it should be noted that the reinforcing film 6 is not provided in association with the heat generating resistor 4. In other words, the reinforcing film 6 is formed only on the top surface of the protection film 3 for the diaphragm 11*b* in which the fluid temperature measuring resistor 5 is incorporated. By virtue of the structure mentioned above, there can be realized the flow-rate detecting device for the heat-sensitive type flow sensor in which the strength of the diaphragm 11*b* is increased without lowering or degrading the flow-rate detection sensitivity (response characteristic) and which can thus ensure a high reliability for the flow-rate detecting operation.

In the flow-rate detecting device for the heat-sensitive type flow sensor according to the first embodiment of the invention, the reinforcing film 6 is formed only on the top surface of the diaphragm 11*b* of the protection film 3. It should however be appreciated that the reinforcing film 6 may be provided over the whole surface of the protection film 3 and then a portion of the reinforcing film 6 corresponding to the heat generating resistor 4 is removed. In this case, the reinforcing film 6 is provided for the fluid temperature measuring resistor 5 while it is not provided for the heat generating resistor 4.

Embodiment 2

In the case of the flow-rate detecting device for the heat-sensitive type flow sensor according to the first embodiment of the invention, the reinforcing film 6 is formed over the top surface of the protection film 3 in the region of the diaphragm 11*b*. However, the reinforcing film 6 may be formed on a back surface of the supporting film 2 in the region of the diaphragm 11*b*.

Figure 6:
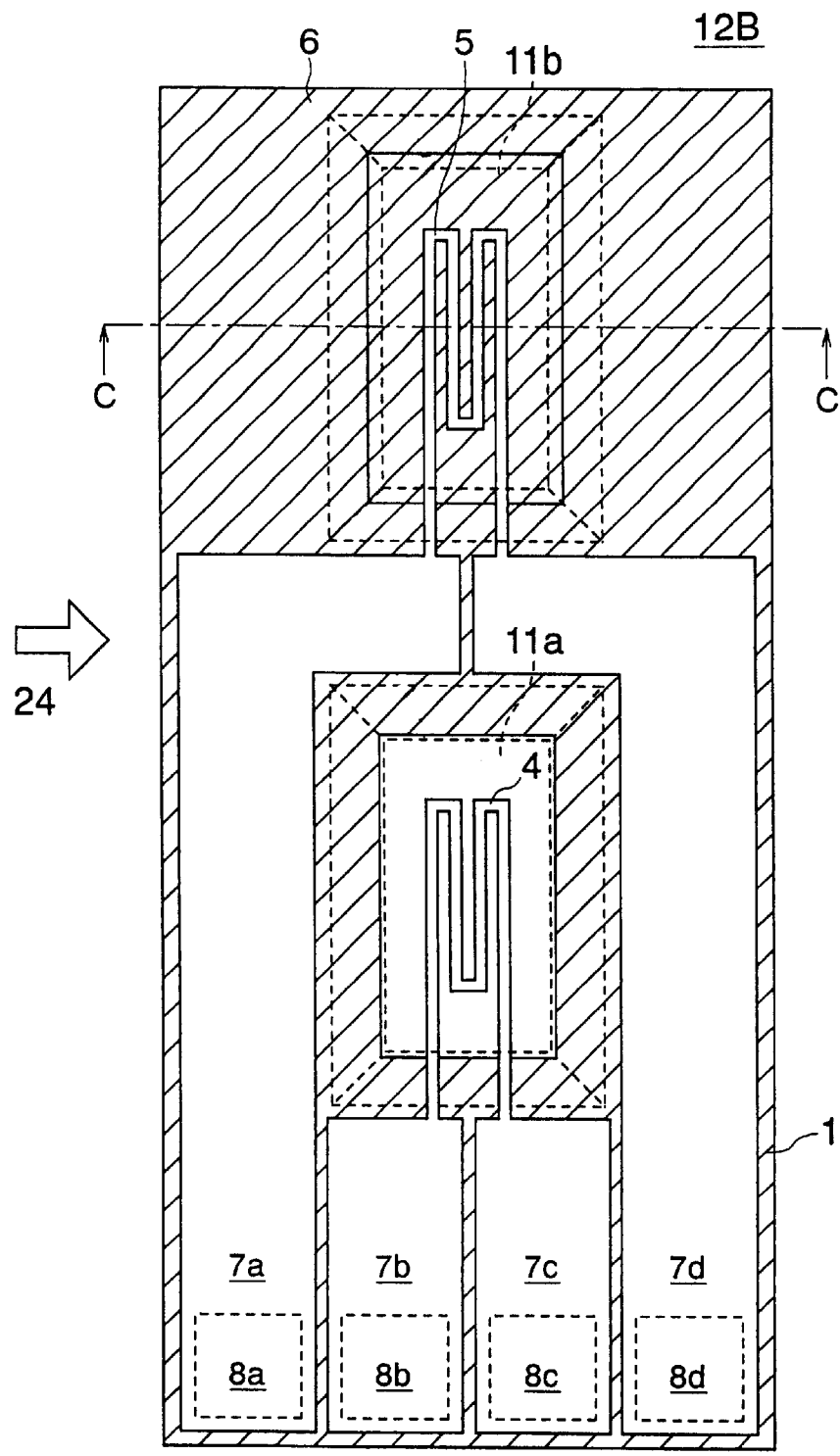
FIG. 6 is a top plan view showing a flow-rate detecting device for a heat-sensitive type flow sensor according to a second embodiment of the present invention.
Figure 7:
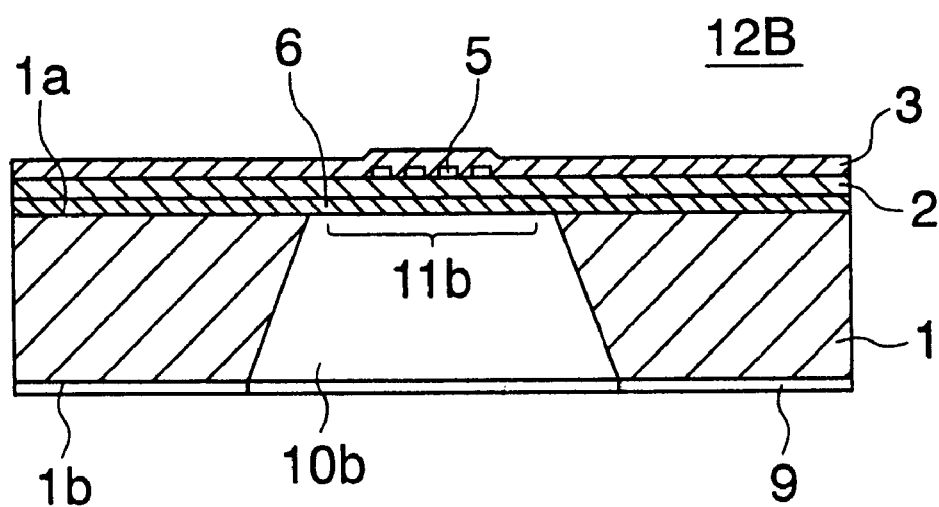
FIG. 7 is a sectional view of the same taken along a line C—C shown and viewed in the direction indicated by arrows in FIG. 6.

Now, description will be made of the flow-rate detecting device for the heat-sensitive type flow sensor according to the second embodiment of the present invention in which the reinforcing film 6 is formed on the back surface of the supporting film 2 in the region of the diaphragm 11*b* by reference to FIG. 6 which shows in a top plan view the flow-rate detecting device 12B for the heat-sensitive type flow sensor according to the instant embodiment of the invention. Incidentally, in FIG. 6, the supporting film and the protection film are omitted from illustration in order to facilitate understanding of the structure of the flow-rate detecting device. Further, FIG. 7 is a sectional view of the same taken along a line C—C shown and viewed in the direction indicated by arrows in FIG. 6. In FIGS. 6 and 7, similar components as those described hereinbefore by reference to FIGS. 1 and 2 are denoted by like reference symbols and detailed description is omitted.

According to the teachings of the present invention incarnated in the instant embodiment, the reinforcing film 6 of 1 μm in thickness is previously formed on the substrate 1. Subsequently, the supporting film 2, the heat generating resistor 4, the fluid temperature measuring resistor 5, the lead patterns 7*a* to 7*d*, the protection film 3, the electrodes 8*a* to 8*d* and the diaphragm 11*a* and the diaphragm 11*b* are formed through similar processes as described hereinbefore in conjunction with the first embodiment of the invention. Finally, only a portion of the silicon oxide deposited on the back side of the diaphragm 11*a* oppositely to the heat generating resistor 4 is removed by using buffered hydrofluoric acid or the like.

By virtue of the structure of the flow-rate detecting device 12B described above, the reinforcing film 6 is formed on the back surface of the supporting film 2 of the diaphragm 11*b* including the fluid temperature measuring resistor 5. Owing to the structure mentioned above, there can be realized the flow-rate detecting device for the heat-sensitive type flow sensor in which the strength of the diaphragm 11*b* is increased without incurring degradation of the flow-rate detection sensitivity (response characteristic) and which can thus ensure high reliability of operation.

Additionally, by forming the reinforcing film 6 on the back surface of the diaphragm 11*b*, the surface of the flow-rate detecting device 12B which is exposed to the fluid can be made more smooth or flat (compare FIG. 7 with FIG. 5), which is very favorable for preventing occurrence of disturbance in the flow of the measurement-destined fluid. In other words, stabilized flow behavior of the measurement-destined fluid can be realized.

In the heat-sensitive type flow sensor according to the instant embodiment of the invention, the reinforcing film 6 is deposited substantially allover on the back surface of the supporting film 2. It should however be appreciated that the reinforcing film 6 may be deposited on the back surface of the supporting film 2 only in the region of the diaphragm 11*b*, essentially to the same effect.

Embodiment 3

In the case of the flow-rate detecting device for the heat-sensitive type flow sensor according to the first embodiment of the invention, the reinforcing film 6 is formed on the top surface of the protection film 3 of the diaphragm 11*b*. However, the reinforcing film 6 may be formed around the fluid temperature measuring resistor 5 which is formed of a heat-sensitive resistance film.

Figure 8:
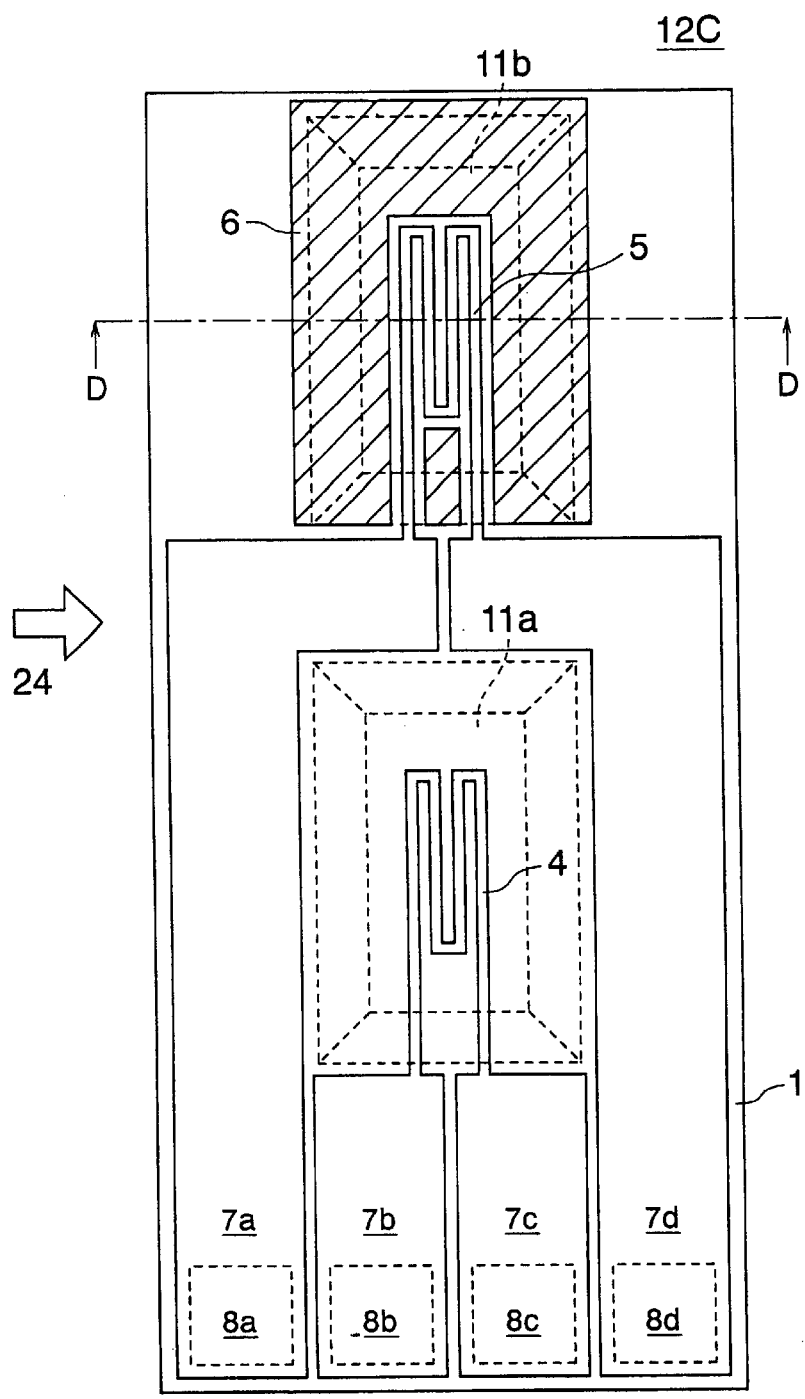
FIG. 8 is a top plan view showing a flow-rate detecting device for a heat-sensitive type flow sensor according to a third embodiment of the present invention.
Figure 9:
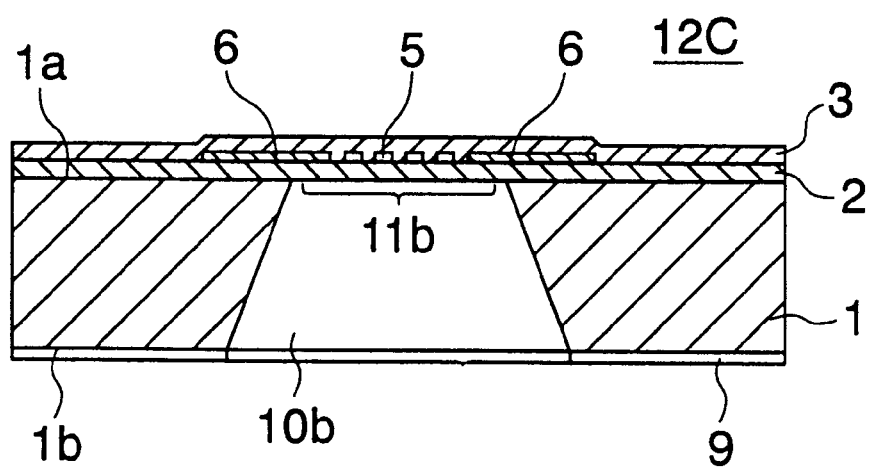
FIG. 9 is a sectional view of the same taken along a line D—D and viewed in the direction indicated by arrows in FIG. 8.

Now, description will be made of the flow-rate detecting device for the heat-sensitive type flow sensor according to the third embodiment of the present invention in which the reinforcing film 6 is formed of the heat-sensitive resistance film and deposited around the fluid temperature measuring resistor 5 by reference to FIG. 8 which shows in a top plan view a flow-rate detecting device 12C for the heat-sensitive type flow sensor according to the third embodiment of the invention. Incidentally, in FIG. 8, the protection film is omitted from illustration in order to facilitate understanding of the structure of the flow-rate detecting device. Further, FIG. 9 is a sectional view of the flow-rate detecting device taken along a line D—D and viewed in the direction indicated by arrows in FIG. 8. In FIGS. 8 and 9, similar components as those described hereinbefore by reference to FIGS. 1 and 2 are denoted by like reference numerals and detailed description will be omitted.

In the flow-rate detecting device for the heat-sensitive type flow sensor according to the instant embodiment of the invention, the reinforcing film 6 formed of a heat-sensitive resistance film is deposited around the fluid temperature measuring resistor 5 simultaneously with the formation of the heat generating resistor 4, the fluid temperature measuring resistor 5 and the lead patterns 7*a* to 7*d* also formed of the heat-sensitive resistance film. Except for this, the structure of the flow-rate detecting device according to the instant embodiment of the invention is essentially same as those described hereinbefore.

By virtue of the structure of the flow-rate detecting device 12C in which the reinforcing film 6 formed of the heat-sensitive resistance film is deposited only around the fluid temperature measuring resistor 5 between the supporting film 2 and the protection film 3 of the diaphragm 11*b* provided with the fluid temperature measuring resistor 5, there can be realized the flow-rate detecting device in which the strength of the diaphragm 11*b* is increased without lowering the flow-rate detection sensitivity (response characteristic) and which can thus ensure high reliability for the flow-rate detecting operation.

Furthermore, since the reinforcing film 6 can be formed simultaneously with the heat generating resistor 4, the fluid temperature measuring resistor 5 and the lead patterns 7a to 7d, the manufacturing process can be simplified with the number of treatment or process steps being reduced.

Embodiment 4

In the case of the flow-rate detecting device for the heat-sensitive type flow sensor according to the first embodiment of the invention, the reinforcing film 6 is formed on the top surface of the protection film 3 of the diaphragm 11b. However, the reinforcing film 6 may be so formed as to be embedded within the supporting film 2 of the diaphragm 11b.

Figure 10:
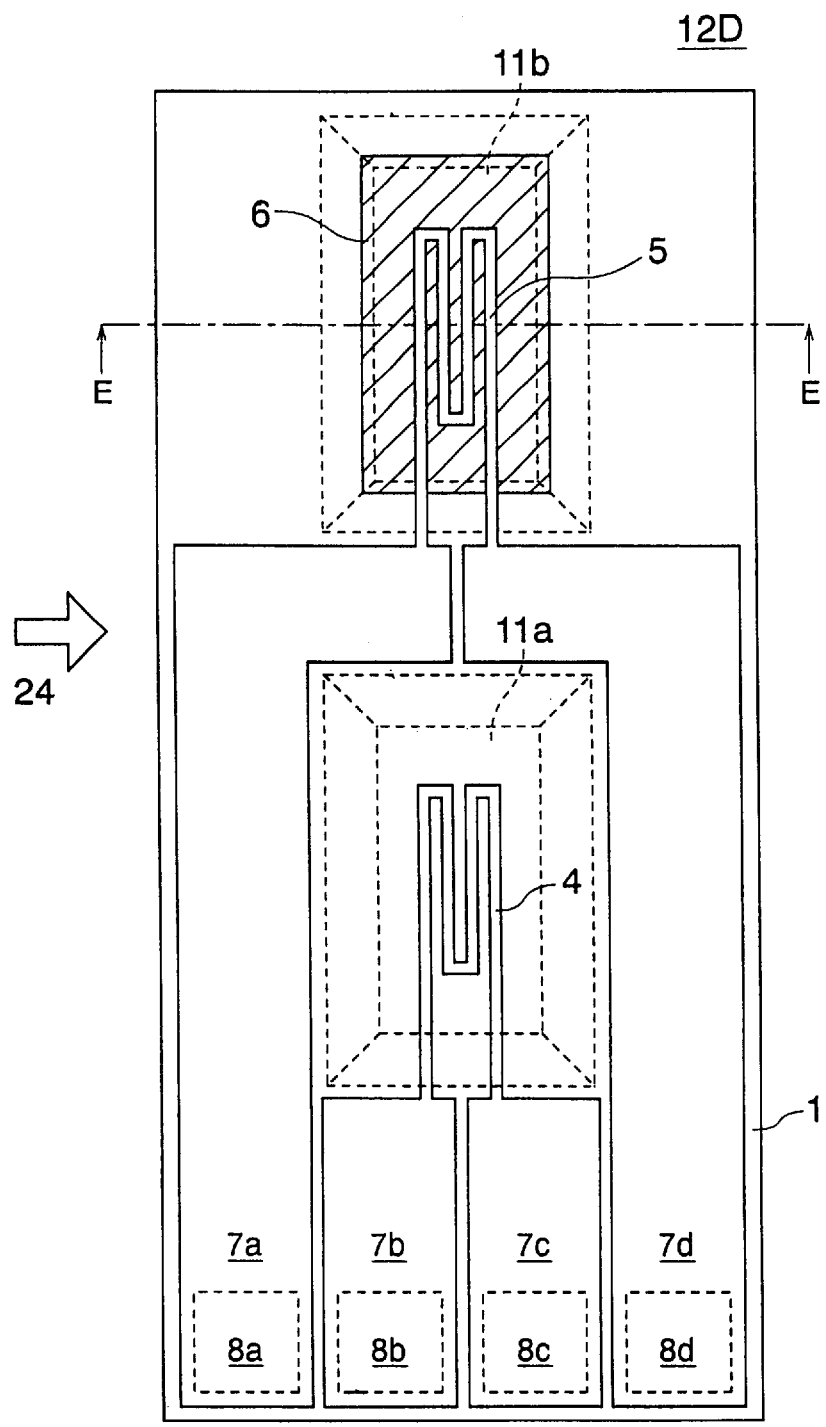
FIG. 10 is a top plan view showing a flow-rate detecting device for a heat-sensitive type flow sensor according to a fourth embodiment of the present invention.
Figure 11:
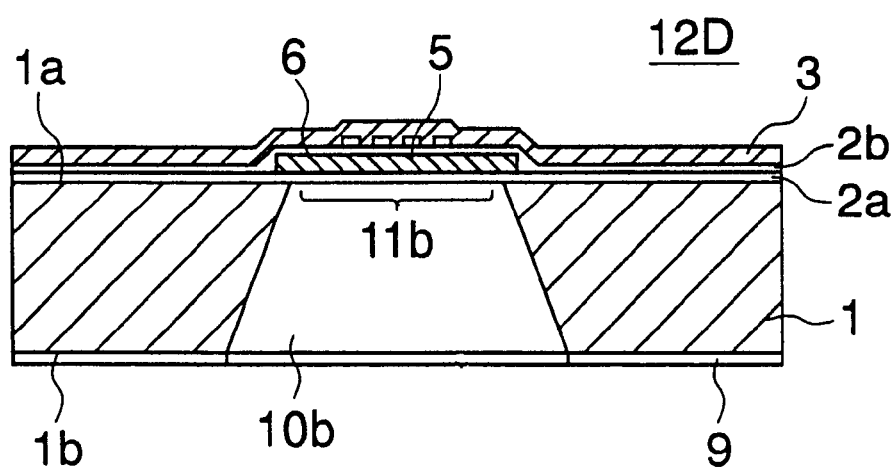
FIG. 11 is a sectional view of the same taken along a line E—E and viewed in the direction indicated by arrows in FIG. 10.

Now, description will be made of the flow-rate detecting device for the heat-sensitive type flow sensor according to the fourth embodiment of the present invention in which the reinforcing film 6 is so formed as to be embedded within the supporting film 2 of the diaphragm 11b by reference to FIG. 10 which shows in a top plan view the flow-rate detecting device 12D for the heat-sensitive type flow sensor according to the instant embodiment of the invention. Incidentally, in FIG. 10, the protection film and the second supporting film are omitted from illustration in order to facilitate understanding of the structure of the flow-rate detecting device 12D. Further, FIG. 11 is a sectional view of the flow-rate detecting device 12D taken along a line E—E and viewed in the direction indicated by arrows in FIG. 10. In FIGS. 10 and 11, similar components as those described hereinbefore by reference to FIGS. 1 and 2 are denoted by like reference symbols and detailed description is omitted.

In the flow-rate detecting device 12D according to the instant embodiment of the invention, a first supporting film 2a is first formed, whereon the reinforcing film 6 (of e.g. polymer of silicon series) is formed on the surface of the first supporting film 2a in a thickness of 1 μm. In that case, the reinforcing film 6 is so processed as to be deposited only in the region of the diaphragm 11b provided with the fluid temperature measuring resistor 5 by resorting to photoengraving, wet-etching, dry-etching or the like. Subsequently, the reinforcing film 6 is covered with a second supporting film 2b. The other components such as the heat generating resistor 4, the fluid temperature measuring resistor 5, the lead patterns 7a to 7d, the protection film 3, the electrodes 8a to 8d and the structures of the diaphragm 11a and the diaphragm 11b are formed essentially in the same manner as those described hereinbefore.

As is apparent from the above, in the flow-rate detecting device 12D according to the instant embodiment of the present invention, the reinforcing film 6 is so formed as to be embedded in the supporting film 2 (i.e., films 2a and 2b) of the diaphragm 11b provided with the fluid temperature measuring resistor 5. Thus, there can be realized the flow-rate detecting device of high reliability in which the strength of the diaphragm 11b is increased without degrading the flow-rate detection sensitivity and the response characteristic or performance of the flow sensor.

Further, because the reinforcing film 6 is covered with the supporting film 2 and not exposed to the fluid, the material for the reinforcing film 6 can be selected with high degree of freedom essentially without need for taking into consideration the anti-corrosiveness of the material.

Embodiment 5

In the case of the flow-rate detecting device for the heat-sensitive type flow sensor according to the first embodiment of the invention, the reinforcing film 6 is formed on the top surface of the protection film 3 in the region of the diaphragm 11b. However, the reinforcing film 6 may be so formed as to be embedded within the protection film 3 in the region of the diaphragm 11b.

Figure 12:
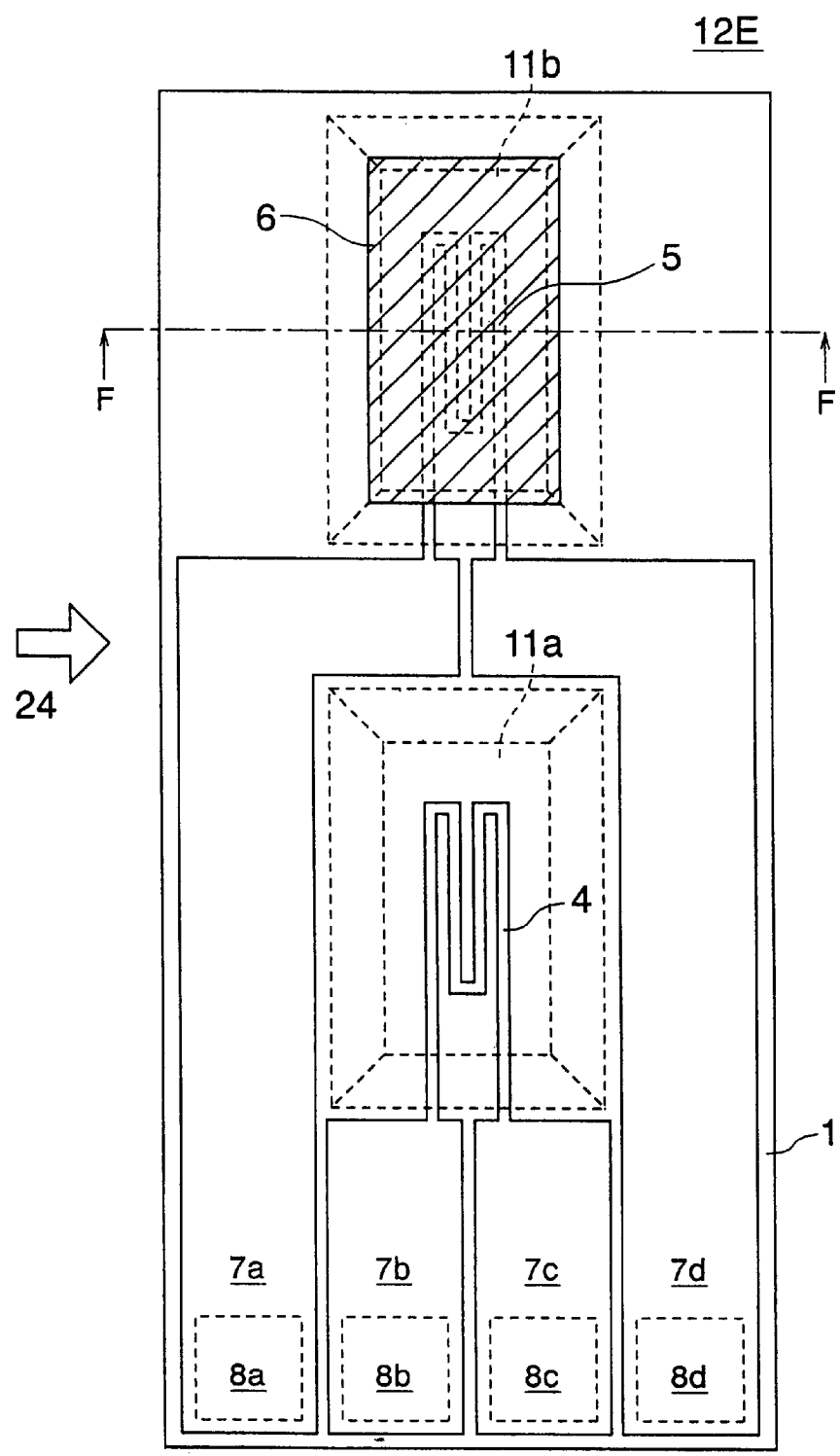
FIG. 12 is a top plan view showing a flow-rate detecting device for a heat-sensitive type flow sensor according to a fifth embodiment of the present invention.
Figure 13:
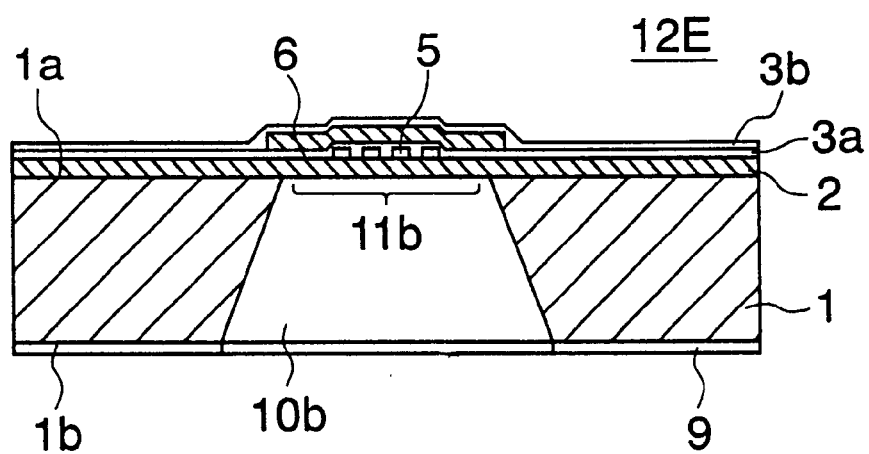
FIG. 13 is a sectional view of the same taken along a line F—F and viewed in the direction indicated by arrows in FIG. 12.
Figure 14:
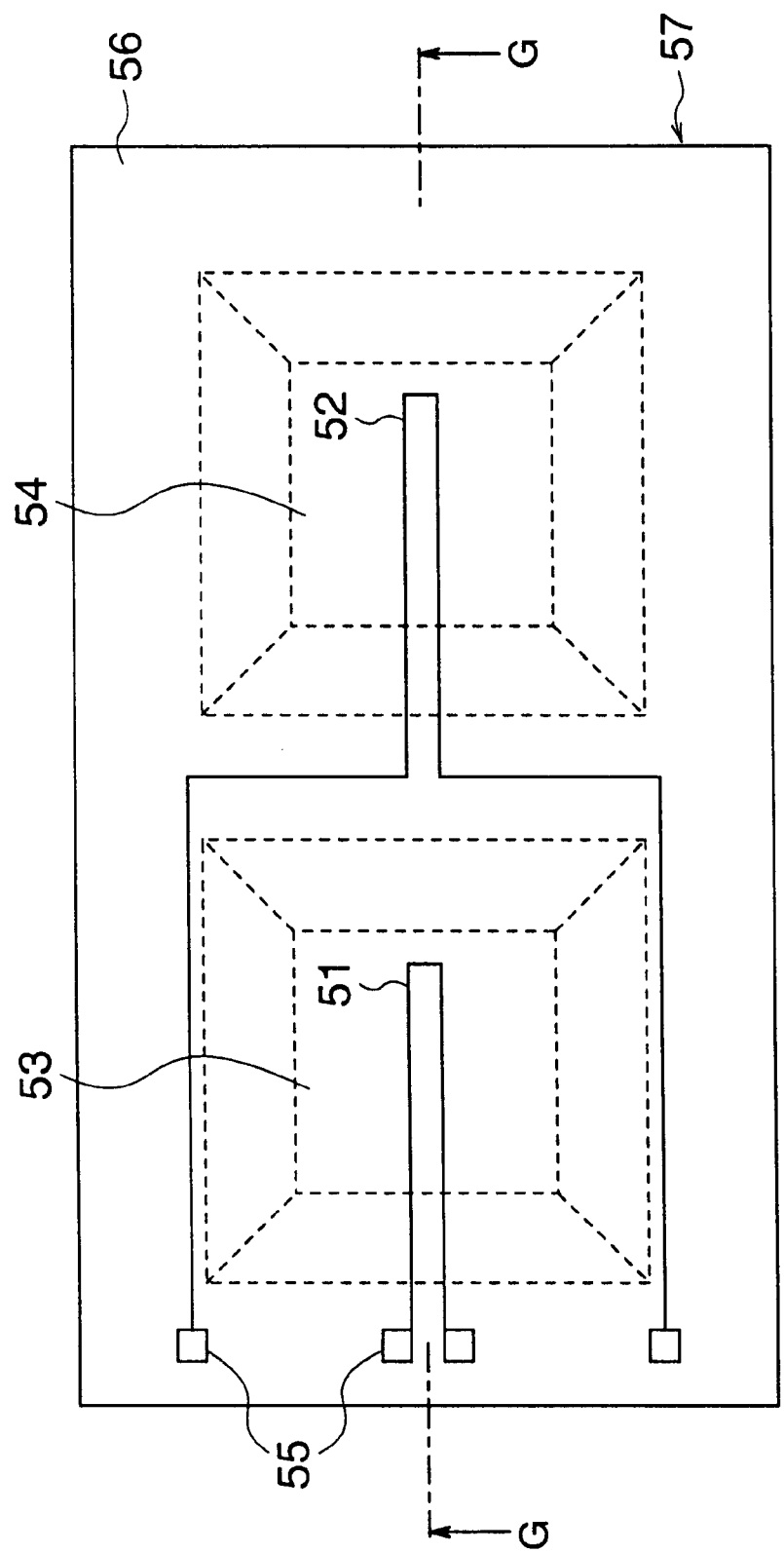
FIG. 14 is a top plan view of a conventional diaphragm-type flow-rate detecting device.
Figure 15:
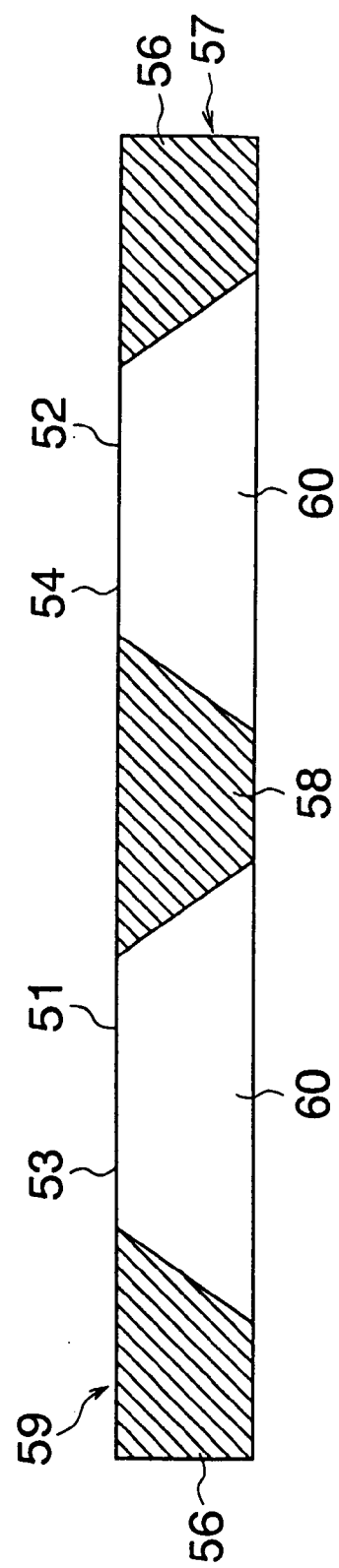
FIG. 15 is a sectional view of the same taken along a line G—G and viewed in the direction indicated by arrows in FIG. 14.

Now, description will be made of the flow-rate detecting device for the heat-sensitive type flow sensor according to the fifth embodiment of the present invention in which the reinforcing film 6 is so formed as to be embedded within the protection film 3 in the region of the diaphragm 11b by reference to FIG. 12 which shows in a top plan view a flow-rate detecting device 12E for the heat-sensitive type flow sensor according to the instant embodiment of the invention. Incidentally, in FIG. 12, both a first protection film and a second protection film are omitted from illustration in order to facilitate understanding of the structure of the flow-rate detecting device 12E. Further, FIG. 13 is a sectional view of the flow-rate detecting device 12E taken along a line F—F and viewed in the direction indicated by arrows in FIG. 12. In FIGS. 12 and 13, similar components as those described hereinbefore by reference to FIGS. 1 and 2 are denoted by like reference symbols and repeated description in detail will be omitted.

In the flow-rate detecting device for the heat-sensitive type flow sensor according to the instant embodiment of the invention, a first protection film 3a is first formed, whereon the reinforcing film 6 (of e.g. polymer of silicon series) is formed on the surface of the first protection film 3a in a thickness of 1 μm. In that case, the reinforcing film 6 is so processed as to be deposited only in the region corresponding to the diaphragm 11b of the fluid temperature measuring resistor 5 by resorting to photoengraving, wet-etching, dry-etching or the like. Subsequently, the reinforcing film 6 is covered with a second protection film 3b. The other components such as the supporting film 2, the heat generating resistor 4, the fluid temperature measuring resistor 5, the lead patterns 7a to 7d, the electrodes 8a to 8d and the structures of the diaphragm 11a and the diaphragm 11b are formed essentially in the same manner as those described hereinbefore.

As is apparent from the above, the flow-rate detecting device 12E according to the instant embodiment of the present invention, the reinforcing film 6 is so formed as to be embedded in the protection film 3 in the region of the diaphragm 11b provided with the fluid temperature measuring resistor 5. Thus, there can be realized the flow-rate detecting device of high reliability in which the strength of the diaphragm 11b is increased without degrading the flow-rate detection sensitivity and the response characteristic or performance.

Further, because the reinforcing film 6 is covered with the protection film 3 and not exposed to the fluid, the material for forming the reinforcing film 6 can be selected with a high degree of freedom without need for paying attention to the anti-corrosiveness of the material.

Many modifications and variations of the present invention are possible in the light of the above techniques. It is therefore to be understood that within the scope of the appended claims, the invention may be practiced otherwise than as specifically described.

What is claimed is:

1. A flow-rate detecting device for a heat-sensitive type flow sensor, comprising:

a planar substrate having first and second through-holes formed therein in juxtaposition with each other;

an insulative supporting film formed over one major surface of said substrate so as to cover said through-holes;

a fluid temperature measuring resistor formed by a heat-sensitive resistor film deposited at a location of said first through-hole on said supporting film oppositely to said substrate;

a heat generating resistor formed of a heat-sensitive resistance film deposited at a location of said second through-hole on said supporting film oppositely to said substrate;

an insulative protection film deposited so as to cover said fluid temperature measuring resistor and said heat generating resistor; and a non-metallic reinforcing film provided for said fluid temperature measuring resistor, said reinforcing film being not provided for said heat generating resistor, wherein flow rate or alternatively flow speed of a fluid is measured on the basis of phenomenon of heat transfer to said fluid from said heat generating resistor.

2. A flow-rate detecting device for a heat-sensitive type flow sensor according to claim 1, wherein said reinforcing film is deposited at a location of said first through-hole on a surface of said protection film oppositely to said fluid temperature measuring resistor.

3. A flow-rate detecting device for a heat-sensitive type flow sensor according to claim 1, wherein said reinforcing film is deposited at a location of said first through-hole on a back surface of said supporting film oppositely to said fluid temperature measuring resistor.

4. A flow-rate detecting device for a heat-sensitive type flow sensor according to claim 1, wherein said reinforcing film is formed of a heat-sensitive resistance film disposed around said fluid temperature measuring resistor.

5. A flow-rate detecting device for a heat-sensitive type flow sensor according to claim 1, wherein said reinforcing film is so formed as to be embedded in said supporting film at a location of said first through-hole.

6. A flow-rate detecting device for a heat-sensitive type flow sensor according to claim 1, wherein said reinforcing film is so formed as to be embedded in said protection film at a location of said first through-hole.

* * * * *